(12) United States Patent
Jakusz

(10) Patent No.: US 10,509,418 B1
(45) Date of Patent: Dec. 17, 2019

(54) *THETA* MERGED 3D ROUTING METHOD

(71) Applicant: Rockwell Collins, Inc., Cedar Rapids, IA (US)

(72) Inventor: Jason J. Jakusz, Cedar Rapids, IA (US)

(73) Assignee: Rockwell Collins, Inc., Cedar Rapdids, IA (US)

(*) Notice: Subject to any disclaimer, the term of this patent is extended or adjusted under 35 U.S.C. 154(b) by 195 days.

(21) Appl. No.: 15/673,252

(22) Filed: Aug. 9, 2017

(51) Int. Cl.
*G05D 1/10* (2006.01)
*G08G 1/16* (2006.01)
*G06Q 50/30* (2012.01)
*G09B 29/00* (2006.01)

(52) U.S. Cl.
CPC .............. *G05D 1/101* (2013.01); *G06Q 50/30* (2013.01); *G08G 1/165* (2013.01); *G09B 29/007* (2013.01)

(58) Field of Classification Search
CPC ........ G05D 1/101; G06Q 50/30; G08G 1/165; G09B 29/007
USPC .......................................................... 701/3
See application file for complete search history.

(56) References Cited

U.S. PATENT DOCUMENTS

| | | | | |
|---|---|---|---|---|
| 6,085,147 A * | 7/2000 | Myers | ................ | G01C 21/3453 342/33 |
| 6,266,610 B1 * | 7/2001 | Schultz | .................. | G05D 1/101 701/528 |
| 6,477,515 B1 * | 11/2002 | Boroujerdi | ............. | G06Q 10/04 701/120 |
| 8,090,531 B2 * | 1/2012 | Goutelard | .............. | G01C 21/00 701/466 |
| 2003/0093219 A1 * | 5/2003 | Schultz | .................. | G01C 21/20 701/533 |
| 2008/0021635 A1 * | 1/2008 | Lohmiller | ............ | G05D 1/0202 701/533 |

* cited by examiner

Primary Examiner — Marthe Y Marc-Coleman
(74) Attorney, Agent, or Firm — Suiter Swantz pc llo

(57) ABSTRACT

A three-dimensional path finding system bifurcates path finding operations between horizontal paths and vertical paths. Horizontal paths are identified according to the Theta* algorithm that produces direct, efficient paths that are viable in a horizontal plane. Vertical paths are identified according to the A* algorithm that produces paths that are viable for an aircraft changing altitude. The horizontal and vertical components are combined to produce a viable, efficient path in three dimensions.

17 Claims, 8 Drawing Sheets

*THETA* MERGED 3D ROUTING METHOD

BACKGROUND

Efficient path finding in three dimensions is complicated. Algorithms exist to define paths between nodes; in two dimensions such algorithms are efficient, but the additional complexity of three dimensions makes them difficult to implement in a real-world environment. Furthermore, some paths identified by certain of these algorithms, while space efficient, are not feasible to implement.

Consequently, it would be advantageous if an apparatus existed that is suitable for efficient, feasible path finding in three dimensions.

SUMMARY

In one aspect, embodiments of the inventive concepts disclosed herein are directed to a path finding avionics system that dynamically employs the A* and Theta* algorithms. Where grandparent and child nodes are at the same altitude, the Theta*, any-angle algorithm is used to produce an efficient path within the plane; while nodes at different altitudes utilize the A* algorithm to maintain viable altitude changing paths.

In a further aspect, embodiments of the inventive concepts disclosed herein are directed to a path finding avionics system that bifurcates path finding operations between horizontal paths and vertical paths. Horizontal paths are identified according to the Theta* algorithm while vertical paths are identified according to the A* algorithm. The horizontal and vertical components are combined to produce a viable, efficient path in three dimensions.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
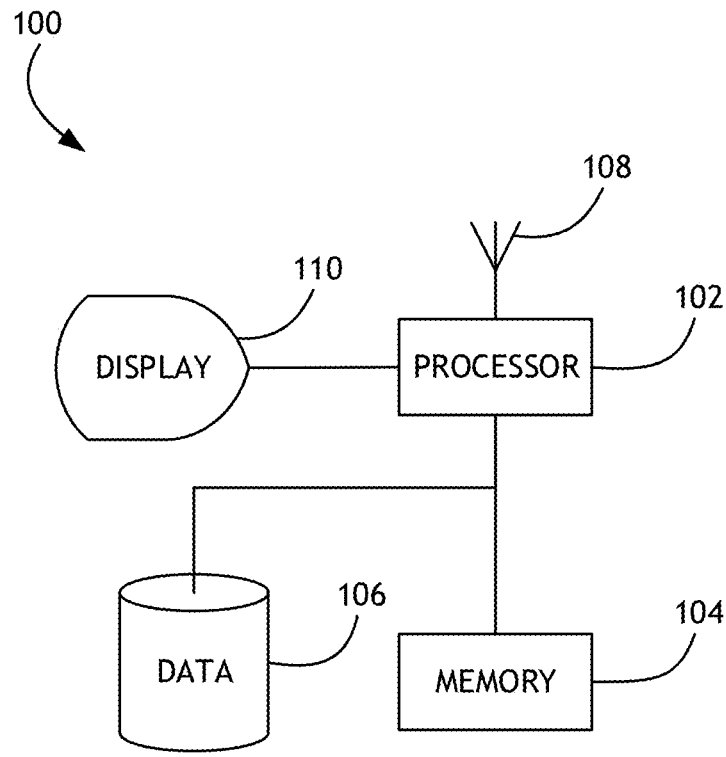
FIG. 1 shows an exemplary embodiment of a system useful for implementing the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a path finding avionics system that dynamically utilizes both node-to-node tree based algorithms and any-angle algorithms based on altitude variations between nodes.

Referring to FIG. 1, an exemplary embodiment of a system 100 useful for implementing the inventive concepts disclosed herein is shown. The system 100 includes a processor 102 configured by processor executable code stored in a memory 104 connected to the processor 102. A data storage element 106 connected to the processor 102 stores terrain maps that may define a set of grid edges. Further, the terrain maps may comprise a three-dimensional space that define a set of grid edges, some of the grid edges being orthogonal to others, such that a first subset of grid edges define a plurality of horizontal planes and a second subset of grid edges define a plurality of vertical planes.

In some embodiments, the processor 102 may receive one or more destination points, or points of transition defining segments of a path, either directly or wirelessly via a wireless data communication element 108 connected to the processor 102. The processor 102 identifies components of the path that are purely horizontal (those that reside substantially within a single horizontal plane) and components of the path that include a significant vertical component (those that transit two or more horizontal planes). Separate algorithms are then used for the horizontal components and vertical components to define traversable paths within the three-dimensional space. It some embodiments, the traversable paths are then displayed on a display device 110.

Figure 2A:
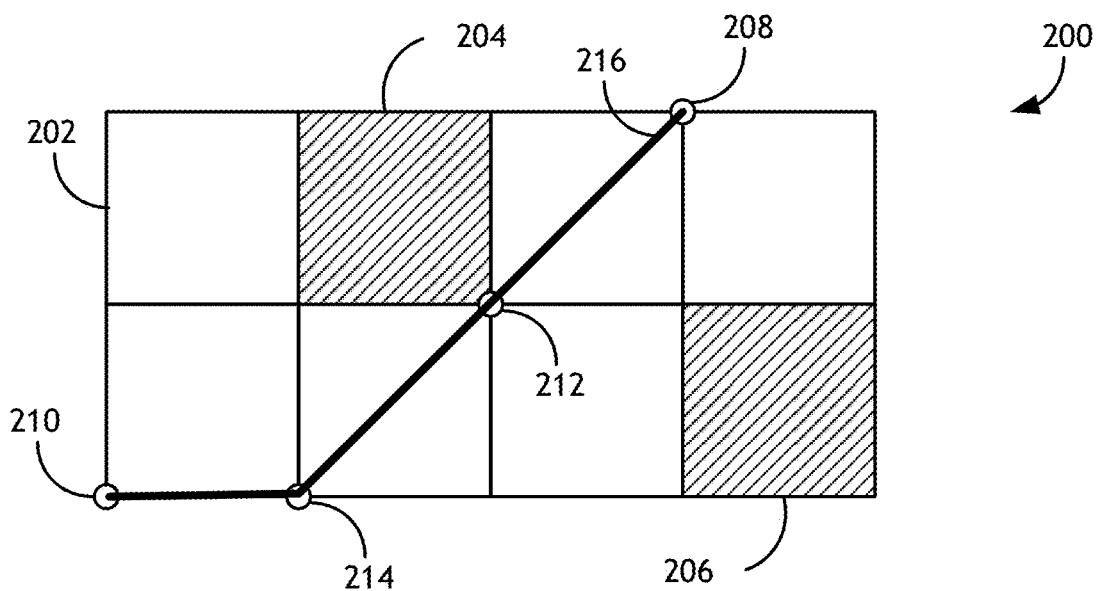
FIG. 2A shows a block representation of path finding in a plane with an A* algorithm.
Figure 2B:
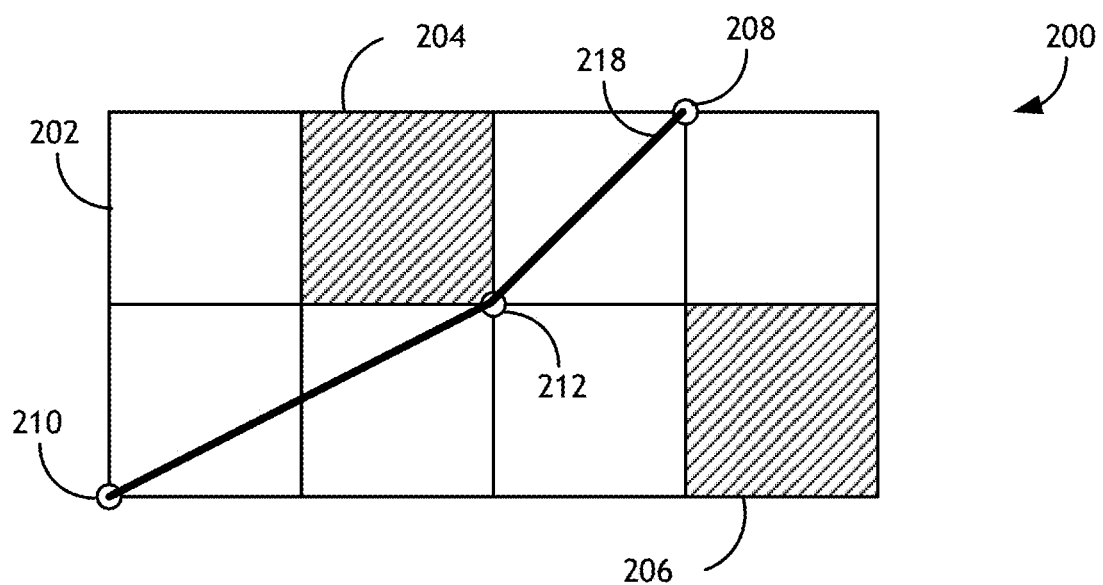
FIG. 2B shows a block representation of path finding in a plane with a Theta* algorithm.

Referring to FIGS. 2A and 2B, block representations of path finding in a plane with different algorithms are shown. A space 200 defining a system of nodes and edges may include traversable spaces 202 and non-traversable spaces 204, 206. Referring specifically to FIG. 2A, a first algorithm, for example an A* algorithm, may receive a starting node 208 and an ending node 210 that define a starting point and ending point for which a path is desired. A processor may expand from the starting node 208 to adjacent nodes via traversable places 202, for example to a first intermediary node 212. Similarly, from the first intermediary node 212 the processor may expand to adjacent nodes, for example to a second intermediary node 214. From the second intermediary node 214, the processor may expand to the ending node 210. Based on a cost value associated with each node traversal, the processor may identify lowest cost path 216 defined according to the first algorithm.

Alternatively, referring to FIG. 2B, a second algorithm, for example a Theta* algorithm, may plot a course from the starting node 208 to the ending node 210 by expanding from the starting node 208 to adjacent nodes, such as the first intermediate node 212. The processor continues expanding to adjacent nodes, but at each expansion backtracks to nodes in previous expansions to identify paths that do not necessarily include only adjacent nodes. The processor thereby identifies an alternative path 218. Depending on the second algorithm, the alternative path 218 may comprise a shortest path through the traversable spaces, or possess other features not defined by the first algorithm.

Figure 3:
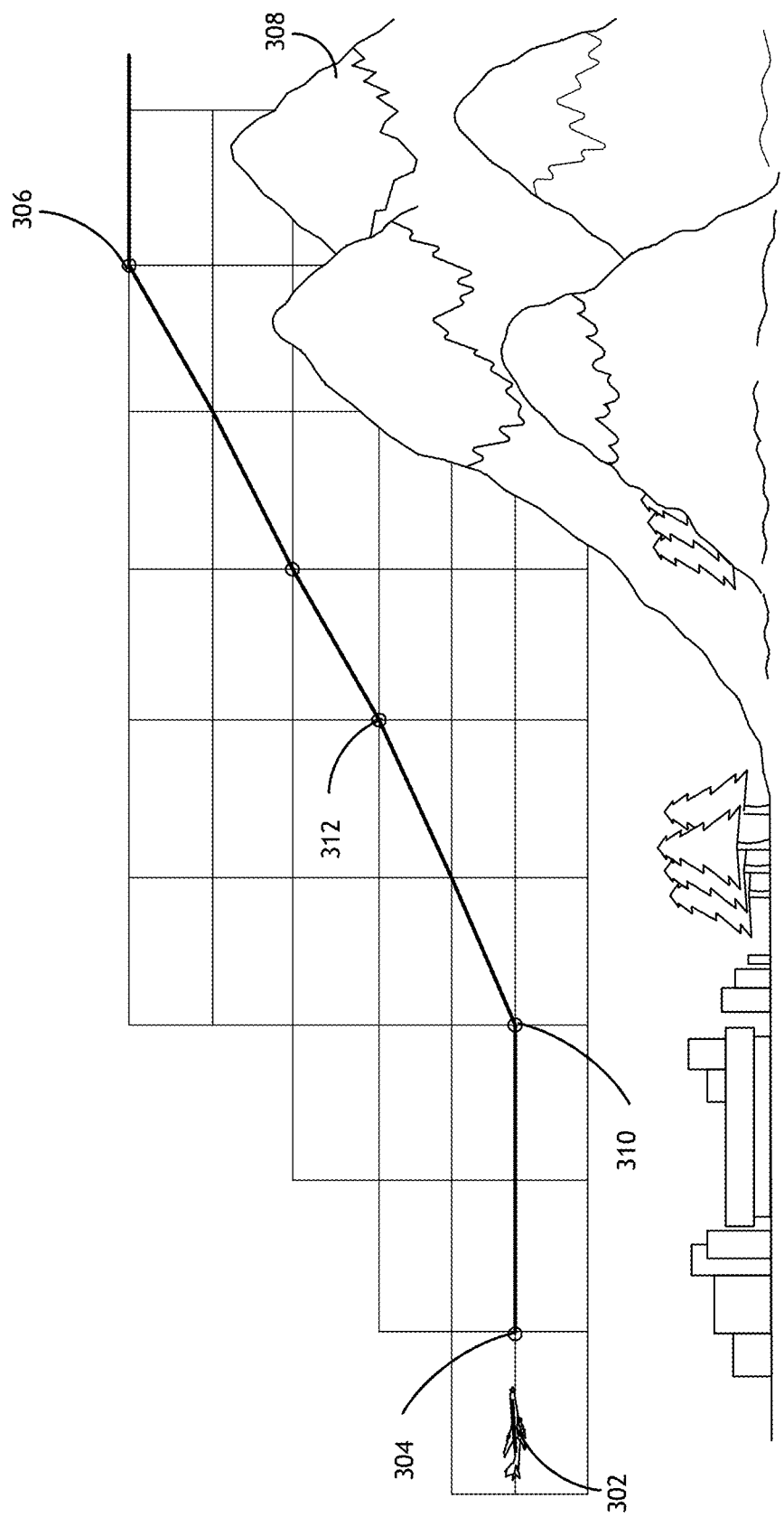
FIG. 3 shows an environmental view illustrating aircraft path finding.
Figure 4A:
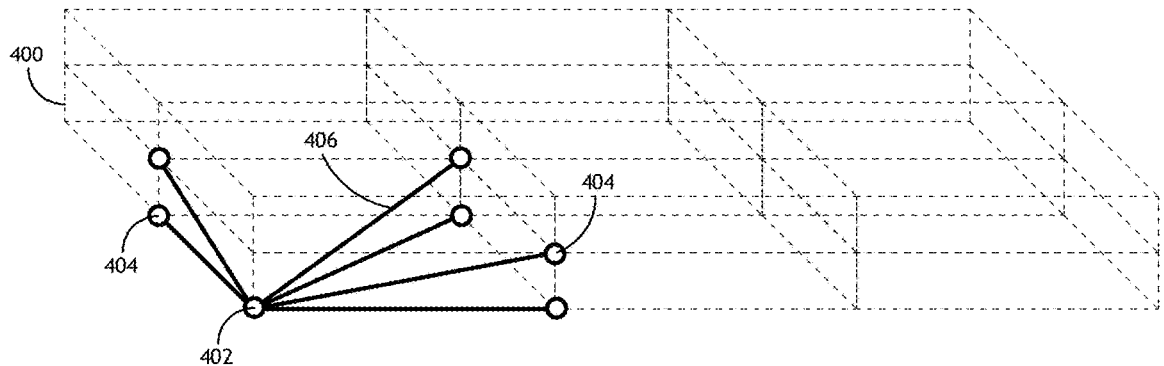
FIG. 4A shows a block representation of a first step in a three-dimensional path finding processes.
Figure 4B:
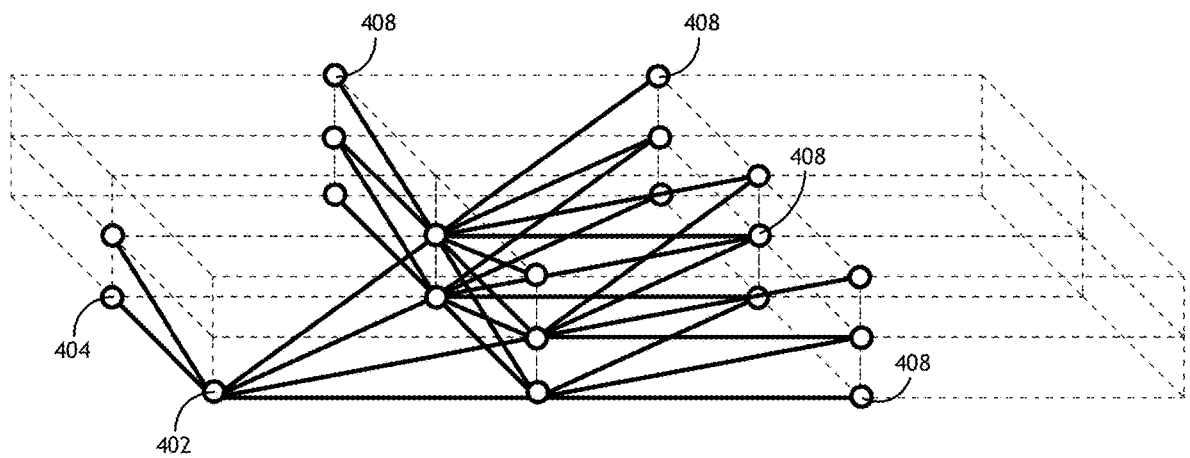
FIG. 4B shows a block representation of a second step in a three-dimensional path finding processes.
Figure 4C:
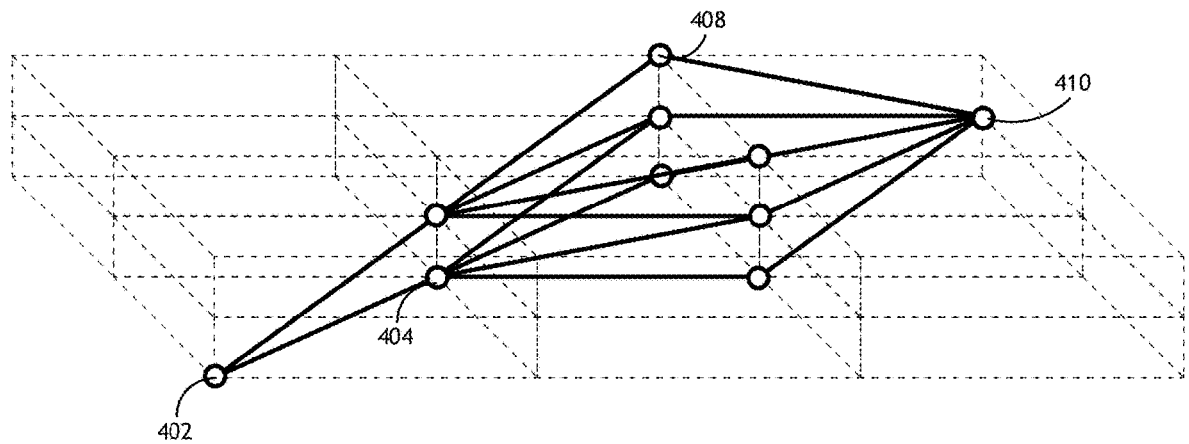
FIG. 4C shows a block representation of paths identified in a three-dimensional path finding processes.
Figure 4D:
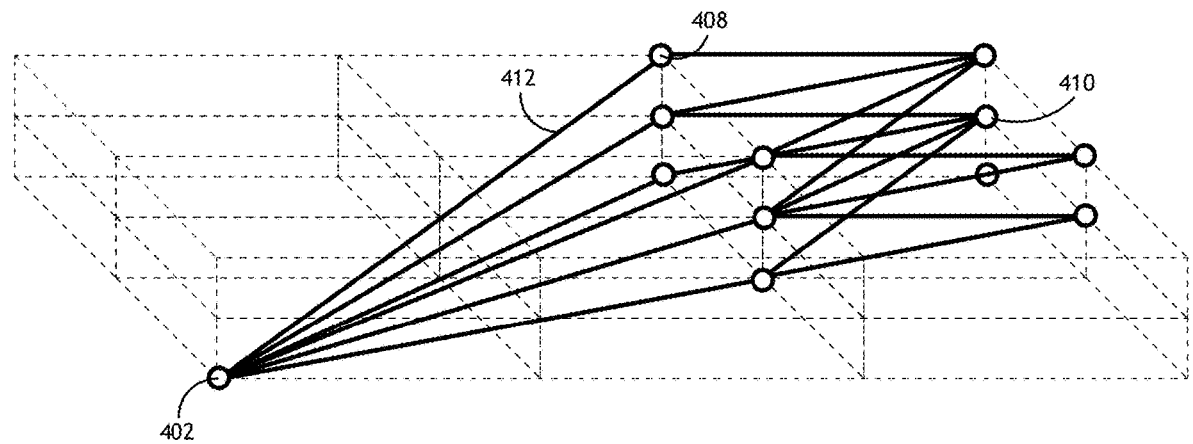
FIG. 4D shows a block representation of an averaging step in a three-dimensional path finding processes.
Figure 4E:
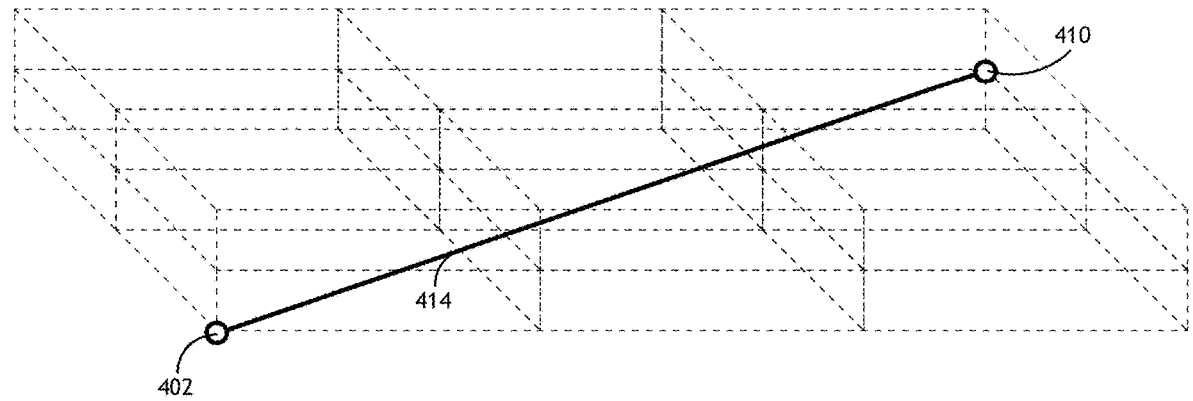
FIG. 4E shows a block representation of a path identified in a three-dimensional path finding processes according to an any-angle algorithm.
Figure 4F:
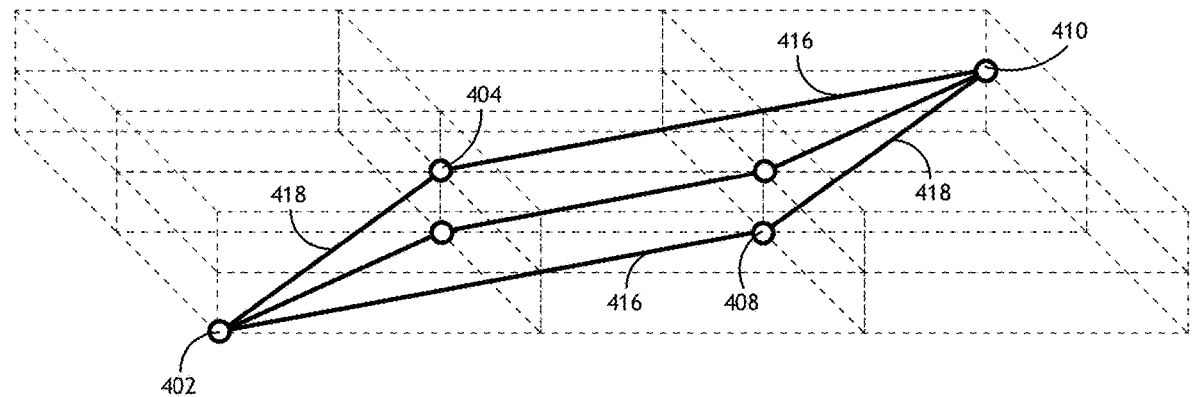
FIG. 4F shows a block representation of paths identified in a three-dimensional path finding processes according to the inventive concepts disclosed herein.

Referring to FIG. 3, an environmental view illustrating aircraft path finding is shown. As distinct from two-dimensional path finding, aircraft 302 engage in three-dimensional path finding. However, there are restrictions as to what constitutes a viable path in three dimensions for an aircraft 302. Specifically, aircraft 302 are artificially restricted in transitioning between altitudes for the purposes of controlling airspace. Furthermore, aircraft 302 have performance limitations that affect their ability to transition between altitudes.

An aircraft 302 beginning at a starting node 304 and attempting to find a path to an ending node 306 may need to transition between altitudes to avoid an obstacle 306 or during routine operations such as climbing to cruising altitude. In at least one embodiment, the aircraft 302 may find a path from the starting node 304 to an intermediate node 310 via an any-angle algorithm such as Theta* provided the starting node 304 and the intermediate node 310 are at substantially the same altitude. From the intermediate node 310 to the ending node 306, which are at differing altitudes, the aircraft 302 may find a path including intervening nodes 312 via a tree based algorithm such as A*.

Referring to FIGS. 4A-F block representations of various steps in a three-dimensional path finding processes are shown. During path finding in a tree based algorithm, the three-dimensional space may be divided into regular or irregular components defining nodes 402, 404. During the path finding process, beginning with a starting node 402, a processor identifies edges 406 connecting the starting node 402 of each neighboring secondary node 404. For discussion of the steps, the starting node 402 may be regarded as a grandparent node 402 and each secondary node 404 may be regarded as a parent node 404.

In one step (FIG. 4B), the processor identifies edges from each parent node 404 to neighboring tertiary or child nodes 408. For simplicity, fewer than all edges are shown. In one step (FIG. 4C), the processor identifies edges from each child node 408 to neighboring quaternary or grandchild nodes 410. For exemplary purposes, the only grandchild node 410 is an ending node 410, and fewer than all possible paths are shown. In a tree based algorithm such as A*, all paths must transit from one node to neighboring nodes.

Using an any-angle algorithm in a first any-angle step (FIG. 4D) between the step (FIG. 4B) and the step (FIG. 4C), the processor identifies any-angle edges 412 from each child node 408 to the grandparent node 402. The any-angle edges 412 may intersect other nodes but such intersection would be incidental; any-angle edges 412 may proceed along any track. Further, using an any-angle algorithm in an any-angle step (FIG. 4E) after the step (FIG. 4C) produces a single any-angle edge 414 from the grandparent node 402 to the grandchild node 410. Such any-angle edge 414 may be unsuitable for aircraft for various reasons discussed herein.

In one embodiment, after each step (FIG. 4A, FIG. 4B, FIG. 4C), a processor determines if the prior node and subsequent node are at the same altitude or in the same horizontal plane; if so, the processor employs an any-angle algorithm to find an edge directly from the prior node to the subsequent node, or from the grandparent node to the child node, bypassing the parent node. In the present example (FIG. 4F), paths from the grandparent node 402 to the grandchild node 410 include any-angle edges 416 between nodes in the same vertical plane and node-to-node edges 418 between nodes where prior and successor nodes do not lay in the same horizontal plane.

Figure 5:
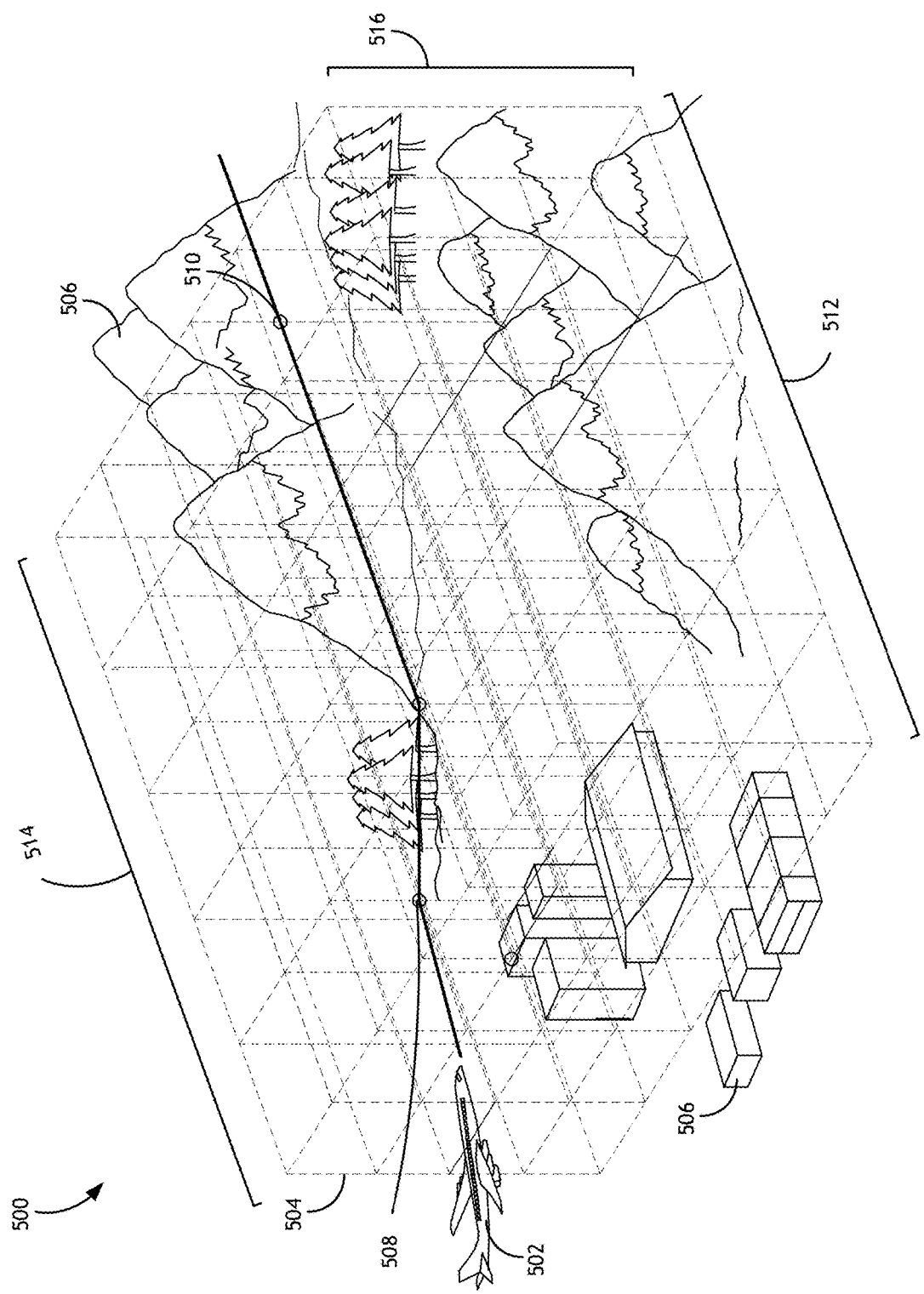
FIG. 5 shows a perspective environmental view of an exemplary embodiment of the inventive concepts disclosed herein.

Referring to FIG. 5, a perspective environmental view of an exemplary embodiment of the inventive concepts disclosed herein is shown. A three-dimensional space 500, for example airspace being traversed by an aircraft 502, may correspond to a system of edges and nodes that define a plurality of traversable spaces 504. The three-dimensional space 500 may coincide with one or more obstacles 506 that define non-traversable spaces. A path finding operation in the three-dimensional space 500 may attempt to find a path from a starting node 508 to an ending node 510.

Especially with regards to aircraft 502, movement in three-dimensional space 500 generally comprises movement at a first altitude, or substantially within a first plane 512, with periodic transitions to a second altitude, or second plane 514 as necessary via climbing or descending vertically 516. The constraints of flight limit the ability of path finding operations in three dimensions to identify efficient paths from the starting node 508 to the ending node 510.

In at least one embodiment, a path finding process identifies edges from the starting node 508 to neighboring nodes, and from those neighboring nodes to secondary neighboring nodes. At each step, a processor finding edges from a current parent node to various child nodes may determine if a child node and grandparent node (prior node to the parent node in the path finding processes) lay in the same horizontal plane within a defined range or variability. If the child node and grandparent node lay in the same horizontal plane, a direct, any-angle edge (such as defined by the Theta*, Field D*, Block A*, or any other A* based or Rapidly-exploring Random Trees based any-angle path finding algorithm) may be defined to connect the grandparent node to the child node. Note that the parent node does not necessarily need to lay in the same horizontal plane.

Where the grandparent node and child node do not lay in the same horizontal plane, the processor maintains direct node-to-node edges (such as defined by the A* algorithm). Such algorithm selection based on horizontal plane transition may be used successively such that strings of successive nodes in a horizontal plane may produce a single long edge.

Such process proceeds node-to-node until paths from the starting node 508 to the ending node 510 are identified. Each path may then be compared to identify the most efficient path. Because path finding included a process to maintain viable steps for vertical transition, the processor does not need to analyze each path for viability.

In an alternative embodiment, a path finding process divides portions of the three-dimensional space 500 to be traversed into horizontal components and vertical components, the vertical components defined by regions where elevation changes are anticipated.

A first algorithm produces one or more horizontal components of a final path. The first algorithm may be Theta* or other any-angle path finding algorithm. Such algorithm may produce an optimal or near optimal path in a horizontal plane such as the first plane 512 or second plane 514.

A second algorithm produces one or more vertical components of a final path. The second algorithm may be A*, or other tree based search algorithm, where angles are constrained to values that are actually feasible for the aircraft 502. In at least one embodiment, such constraint may be achieved by defining the traversable spaces 504 with node distances that prevent infeasible paths provided such paths are node-to-node during elevation changes.

In some embodiments, the process may define intermediate nodes based on the anticipated location where an elevation change will begin and end. The intermediate nodes then become the starting and ending nodes for separate horizontal components and vertical components according to the first and second algorithms.

In some embodiments, the process may produce an optimal or near optimal horizontal path from the starting node 508 to a projection of the ending node 510 within the horizontal plane of the starting node 508. Likewise, the process may produce a feasible elevation transition path from the horizontal plane of the starting node 508 to the horizontal plane of the ending node 510. The process then interposes the elevation transition path into the horizontal path at a location corresponding to a desired beginning point for an elevation transition, such as where an aircraft 502 is ordered to climb to a cruising altitude. In at least one embodiment, it may be necessary to transform the feasible elevation transition path to correspond to the horizontal path before interposition.

The process produces a final path having optimal or near optimal horizontal components and feasible vertical components.

Figure 6:
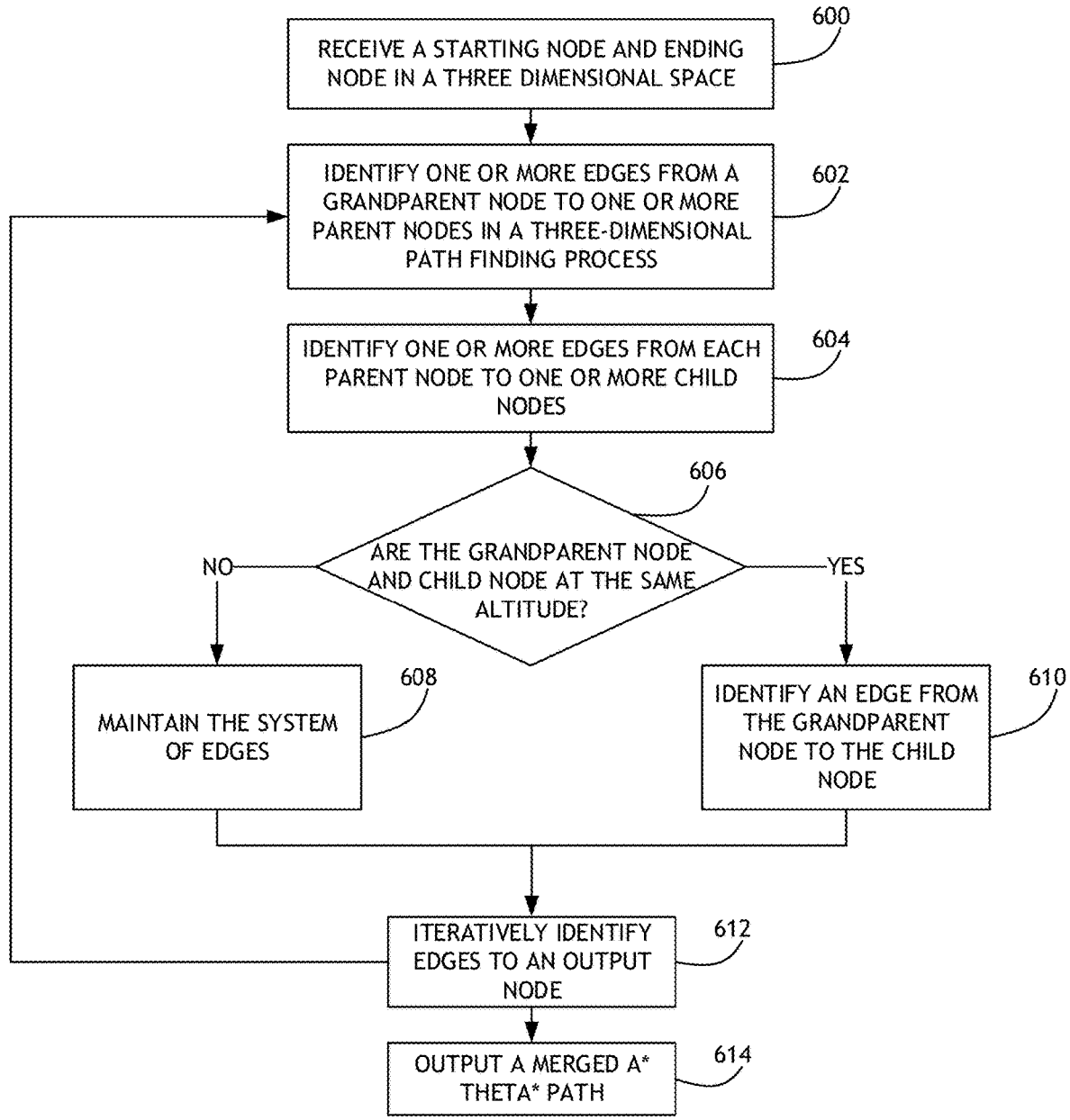
FIG. 6 shows a flowchart of an exemplary embodiment of the inventive concepts disclosed herein.

Referring to FIG. 6, a flowchart of an exemplary embodiment of the inventive concepts disclosed herein is shown. A starting (grandparent) node and ending node in a three-dimensional space is received 600. Edges from the grandparent node to one or more parent nodes are identified 602, and edges from each parent node to one or more child nodes are identified 604 via a tree based algorithm such as A*.

For each child node, it is determined 606 if the grandparent node and child node lay in substantially the same horizontal plane or, in real world aircraft path finding, are at substantially the same altitude within a predetermined range. If not, the edges identified via the tree based algorithm are maintained 608. If the grandparent and child nodes are at substantially the same altitude, any-angle edges are identified 610 via an any-angle algorithm such as Theta* from the grandparent node to the child node.

The process iteratively identifies 612 edges from successive nodes (each child node becoming a parent node for a subsequent iteration) until paths to the ending node are identified and one or more merged Theta* A* paths are output 614.

Figure 7:
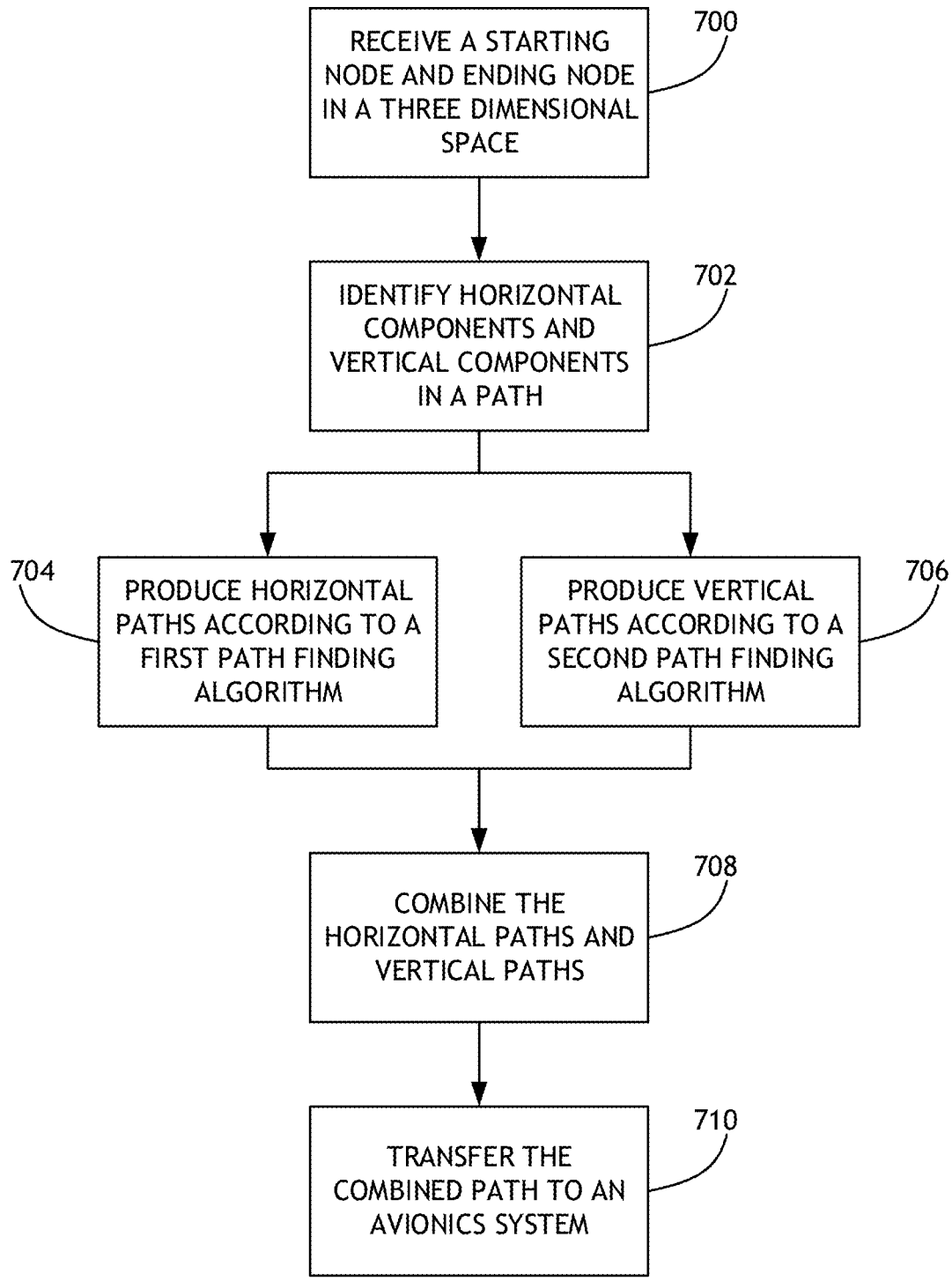
FIG. 7 shows a flowchart of an exemplary embodiment of the inventive concepts disclosed herein.

Referring to FIG. 7, a flowchart of an exemplary embodiment of the inventive concepts disclosed herein is shown. A starting node and ending node in a three-dimensional space is received 700. Horizontal components and vertical components in the three-dimensional space from the starting node to the ending node are identified 702. Horizontal paths are produced 704 from the horizontal components based on a first algorithm. The first algorithm may be an any-angle path planning algorithm. Vertical paths are produced 706 from the vertical components based on a second algorithm. The second algorithm may be a tree based algorithm where the nodes are organized to prevent node-to-node transitions that are infeasible for an aircraft.

The horizontal paths and vertical paths are combined 708 to produce a feasible, near optimal path in three dimensions. In at least one embodiment, the combined path is transferred to an avionics system for implementation.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A computer apparatus comprising:
   at least one processor;
   a data storage element connected to the processor storing a node network representing a three-dimensional space corresponding to a terrain map;
   a memory connected to the at least one processor storing processor executable code for configuring the at least one processor to:
   receive a starting node and an ending node in the three-dimensional space;
   iteratively identify one or more paths from a parent to a child node using a first algorithm, the first algorithm including path smoothing processes between child nodes and grandparent nodes earlier than corresponding parent nodes;
   determine if the child node resides in a different horizontal plane as compared to the grandparent node;
   identify a path from the parent node to the child node using a second algorithm where the child node resides in a different horizontal plane as compared to the parent node; and
   transfer the one or more horizontal paths and one or more vertical paths to an avionics system.

2. The computer apparatus of claim 1, wherein the first algorithm is an any-angle path planning algorithm and the second algorithm is a tree based path planning algorithm.

3. The computer apparatus of claim 2, wherein the first algorithm is Theta* and the second algorithm is A*.

4. The computer apparatus of claim 1, wherein determining if the child node resides in a different horizontal plane as compared to the grandparent node includes an acceptable deviation defined by one of a performance factor of an aircraft and an airspace constraint.

5. The computer apparatus of claim 1, wherein the processor executable code further configures the at least one processor to:
   backtrack to one or more prior nodes to the grandparent node;
   determine if such prior nodes lay in the same horizontal plane as the child node; and
   identify one or more any-angle paths from the one or more prior nodes to the child node.

6. The computer apparatus of claim 1, wherein nodes in the three-dimensional space are defined with ratios of horizontal edge distance to vertical edge distance such that the one or more vertical paths are feasible for a corresponding aircraft.

7. A method comprising:
   receiving a starting node and an ending node in a three-dimensional space;
   identifying one or more horizontal components from the starting node to the ending node;
   identifying one or more vertical components from the starting node to the ending node;
   producing one or more horizontal paths from the horizontal components based on a first path finding algorithm comprising an any-angle path planning algorithm;
   producing one or more vertical paths from the vertical components based on a second path finding algorithm comprising a tree based path planning algorithm, different from the first path finding algorithm; and
   transferring the one or more horizontal paths and one or more vertical paths to an avionics system.

8. The method of claim 7, wherein the first algorithm is Theta* and the second algorithm is A*.

9. The method of claim 7, further comprising defining intermediate nodes, the intermediate nodes defining starting nodes and ending nodes of the one or more horizontal paths and one or more vertical paths.

10. The method of claim 7, further comprising:
    projecting the ending node into a horizontal plane defined by the starting node; and
    interposing the one or more vertical paths into the one or more horizontal paths.

11. The method of claim 7, wherein nodes in the three-dimensional space are defined with ratios of horizontal edge distance to vertical edge distance such that the one or more vertical paths are feasible for a corresponding aircraft.

12. An avionics system comprising:
    at least one processor;
    a data storage element connected to the processor storing a node network representing a three-dimensional space corresponding to a terrain map;
    a memory connected to the at least one processor storing processor executable code for configuring the at least one processor to:
    receive a starting node and an ending node in the three-dimensional space;
    iteratively identify one or more paths from a parent to a child node using a first algorithm, the first algorithm including path smoothing processes between child nodes and grandparent nodes earlier than corresponding parent nodes;
    determine if the child node resides in a different horizontal plane as compared to the grandparent node;
    identify a path from the parent node to the child node using a second algorithm where the child node resides in a different horizontal plane as compared to the parent node; and
    transfer the one or more horizontal paths and one or more vertical paths to the avionics system.

13. The avionics system of claim 12, wherein the first algorithm is an any-angle path planning algorithm and the second algorithm is a tree based path planning algorithm.

14. The avionics system of claim 13, wherein the first algorithm is Theta* and the second algorithm is A*.

15. The avionics system of claim 12, wherein determining if the child node resides in a different horizontal plane as compared to the grandparent node includes an acceptable deviation defined by one of a performance factor of an aircraft and an airspace constraint.

16. The avionics system of claim 12, wherein the processor executable code further configures the at least one processor to:
    backtrack to one or more prior nodes to the grandparent node;
    determine if such prior nodes lay in the same horizontal plane as the child node; and
    identify one or more any-angle paths from the one or more prior nodes to the child node.

17. The avionics system of claim 12, wherein nodes in the three-dimensional space are defined with ratios of horizontal edge distance to vertical edge distance such that the one or more vertical paths are feasible for a corresponding aircraft.

* * * * *